Patented Dec. 30, 1924.

1,521,055

UNITED STATES PATENT OFFICE.

THEODORE FRANÇOIS TESSE, OF PARIS, FRANCE, ASSIGNOR TO SOCIETE NAUTON FRÈRES & DE MARSAC, OF ST. OUEN, FRANCE, AND THÉODORE FRANÇOIS TESSE, OF PARIS, FRANCE.

COATED AEROPLANE CLOTH AND PROCESS OF MAKING SAME.

No Drawing. Application filed October 4, 1916, Serial No. 123,640, Renewed December 6, 1920. Serial No. 428,815.

*To all whom it may concern:*

Be it known that I, THEODORE FRANÇOIS TESSE, of 69 Avenue des Ternes, Paris, Republic of France, docteur ès sciences, have invented a Coated Aeroplane Cloth and Process of Making Same, of which the following is a full, clear, and exact description.

This invention has for its object to provide an improved process of coating aeroplane cloths, namely the cloths forming the surfaces of the wings of aeroplanes, by the employment of several layers each adapted to produce certain desired effects, whereby by the combination of such layers, the desirable effects of each are retained, and the several undesirable effects (which each of the said layers alone would have) are to a certain extent neutralized.

In carrying out the process of this invention I preferably proceed as follows:

Step 1. The cloth, already on the frame forming the wing, is first treated with an impregnating solution, for which purpose a solution of cellulose acetate, in a volatile solvent is employed, and which solution does not necessarily contain any other ingredients. This solution is then allowed to dry, that is to say the solvent is allowed to evaporate, and in evaporating and drying, the effect of what is technically known as "stretching" is produced, that is to say the fabric is put into what might be considered as a "stretched" condition, or in other words the fabric is put under considerable tension.

Step 2. The second step of the process consists in applying one or more layers of a second coating, composed of a novel composition, covered generically in my copending application (filed Jan. 30, 1918, Serial No. 214,525) which composition may carry the pigment or color and ingredients capable of modifying the effect of the first coating above described, and the third coating to be described below. The base of this second composition is a cellulose acetate solution (or other cellulose ester solution) in a solvent of low boiling point, such as acetone or methyl acetate, together with a combination of liquids of high boiling points, which liquids are capable of imparting plasticity and elasticity to the cellulose acetate. Among such liquids the following are mentioned: (*a*) the compounds of the methylpropylphenol series whose boiling points are above 200° C. and which are liquid at ordinary temperature, such as carvacrol, boiling point 236° C., carvol, boiling point 225° C., or (*b*) the ethers of monatomic phenols, having unsaturated lateral chains and their isomers and their methyl derivatives, and of this class eugenol (boiling point 247° C.) and iso-eugenol (boiling point 260° C.) are bodies which have been found to be especially useful. These substances may be used singly or in combination, and there is also preferably added a substance capable of increasing the suppleness and softness and flexibility, such as triacetin and also to this mixture there is added a body capable of preventing the precipitation of cellulose ester, such as benzylic alcohol, or aceto-acetic ether. To this is also added an inert compound such as pigment, for example zinc oxid, the function of which is to counteract any excessive softness produced by the high boiling point liquids in the large quantity in which they are necessarily used.

In the present invention, there is also preferably added to this second coating composition, finely pulverized metal, such as aluminum, bronze or copper, etc. Of these, aluminum is of particular importance, and this metal is used in the form of an impalpable powder.

The function of the metal is to strengthen the coating, to render the coating more flexible, to still further reduce the inflammability of the coating, and also it has a particular effect on the visibility of the aeroplane.

The use of metallic powder allows of using a somewhat larger proportion of the high boiling-point liquids, without causing the cloths to become slack.

To obtain a coating having sufficient elasticity, plasticity and softness, it has been found that relatively large quantities of high boiling point liquids are to be used and in such conditions the tension of the cloth decreases in large proportion. For counteracting this detrimental effect, an inert material is added in such proportions as to restore the strength of the coating and especially also the necessary tension of the cloth.

The example herein indicated shows approximately the relative proportion of the two classes of bodies, viz, high boiling point liquids and inert material whose proper combination allows of obtaining the desired result of plasticity, elasticity, softness, suppleness, resistance and strength in the coating, and at the same time maintaining the necessary tension in the cloth.

The application of the coating composition to the planes has the effect of metallizing them and by reflecting the light from the same, reduces the visibility of the aeroplane, hence renders the determination and altitude of the aeroplane (by observers located on the ground or a distance away) much more difficult. The metal particles act as reflectors for the rays of the sun, thereby prevents the sun from penetrating into the coating, and hence prevents such decomposition of the components of the coating as are produced or accelerated by the action of direct sunlight.

The following particulars are given to illustrate a suitable method of preparing the improved coating composition for the second layer:

A solution of cellulose acetate in acetone or methyl acetate containing 70 to 80 gms. of the cellulose ester per litre is prepared. 100 kgs. of this solution is mixed with 2 to 5 kgs. of pigment and preferably also 2 to 3 kgs. of impalpable metallic powder (powdered aluminum, bronze, copper or other metal); 2 kgs. of eugenol or other liquid having a high boiling point as stated above, 2 kgs., of benzylic alcohol, and 1 to 2 kgs. of triacetin are then added.

The proportions of these liquids of high boiling points should be increased if it is desired to produce very flexible skins or coatings.

After allowing this second coating to dry, it is "pounced" or rubbed down very slightly, or is very lightly sand-papered. This produces a dead flat surface.

Step 3. There is finally applied to the fabric treated as above, a third coating, having the same or substantially the same composition as the first coating above referred to. By this application of a third coating, there is produced the effect of imprisoning the second coating, between two closely adherent films of cellulose acetate.

Without limiting myself to the particular details given, and for the sake of illustration only, the following examples of the coating compositions are given. The first and third coating solutions may be composed of about 8 parts by weight of cellulose acetate in 92 parts of acetone or methyl acetate. The second and intermediate coating composition may contain 8 parts by weight of cellulose acetate in 92 parts of acetone or methyl acetate, to which there is added, per 100 kgs. of solution, 2 to 3 kgs. of impalpable metallic powder, such as aluminum, 2 to 5 kgs. of very fine and very light zinc oxid, and to 2 to 3 kgs. of eugenol, or one of the other high boiling point liquids added, together with 1 to 2 kgs. of triacetin. There is also added aceto-acetic ether or benzylic alcohol, for facilitating the formation of a film. This mixture is thoroughly ground, for example in a paint mill.

In applying what is referred to as the second coating, in many cases it is advisable to apply several layers of the composition, and allow each layer to dry or partially dry, before adding the next layer.

The bottom layer, which impregnates the fabric, and also the top layer, both consisting (after the removal of solvent) essentially of cellulose acetate, are relatively rigid. These layers serve also to prevent evaporation of the relatively non-volatile liquids mentioned, which serve as plasticifying agents, agents imparting elasticity and suppleness to the cellulose ester, which also carries the inert material. The intermediate layer is distinguished from the bottom and top layers of the composite coating in that this intermediate layer is permanently flexible, and hence modifies the effect of the rigid layers, and is itself in turn affected thereby, so that the entire coating is simultaneously rigid and flexible.

It is to be understood that the improved metallic coating composition is capable of being used for numerous industrial purposes and that the proportions and nature of its constituents may be modified according to such purposes, and it is also to be understood that when metallic powders are employed as the inert substance, no chlorinated products should be used as a solvent for the cellulose ether.

The process of the present application constitutes an improvement upon that described and claimed in my copending application 71,201, filed Jan. 10, 1916, of which the present case is in part a continuation.

I claim:

1. A process of coating fabrics, which comprises applying thereto in succession, three coatings, as follows:—first, a solution in a volatile solvent containing a cellulose ester as a base; second, a coating composition comprising a cellulose ester, liquids of high boiling point capable of imparting plasticity, elasticity and suppleness, and capable of preventing the precipitation of the cellulose ester, such components being dissolved in a volatile solvent, and a fine metallic powder; and third, a solution in a volatile solvent containing a cellulose ester as a base; allowing each of the first two coatings to dry before applying the next coating, whereby the second flexible coating is imprisoned between two layers of more rigid cellulose ester.

2. A process which comprises coating a fabric with a succession of coating layers, an intermediate one of said coating layers comprising a cellulose ester and a plurality of normally non-volatile liquids capable of imparting plasticity, elasticity and suppleness, and capable of preventing the precipitation of the cellulose ester, and another liquid capable of imparting softness and flexibility, and a fine metallic powder, such intermediate layer being imprisoned between layers of material substantially impervious to such liquids.

3. A process which comprises coating a fabric with a succession of coating layers, an intermediate one of said coating layers comprising a cellulose ester and a plurality of normally non-volatile liquids capable of imparting plasticity, elasticity and suppleness, and capable of preventing the precipitation of the cellulose ester, and another liquid capable of imparting softness and flexibility, and finely powdered aluminum, such intermediate layer being carried between two closely adherent layers of less flexibility and of greater rigidity, whereby a structure is provided having a desired degree of rigidity and flexibility.

4. A fabric forming the covering of an aeroplane, said fabric being provided with a composite coating comprising a succession of at least three layers of compositions having a fatty acid ester of cellulose as a base, an intermediate one of which layers has a greater elasticity and flexibility than the outer layers, and which contains a finely divided metal.

5. A fabric having a composite coating comprising a succession of at least three layers of material including a cellulose ester of a fatty acid, an intermediate one of which layers contains metal in the form of an impalpable powder and has as ingredients thereof, liquids of high boiling points including one which is capable of imparting plasticity and elasticity, another which is capable of increasing the suppleness and softness and flexibility and another which is capable of preventing the precipitation of the cellulose ester, the evaporation of which liquids is prevented by the imprisonment of such layer between the outer layers.

6. A process of coating fabrics, which comprises applying thereto in succession, three coatings, as follows:—first, a solution in a volatile solvent containing a cellulose ester as a base; second, a coating composition comprising a cellulose ester, liquids of high boiling points, a volatile solvent for such constituents, and an inert material; and third, a solution in a volatile solvent, containing a cellulose ester as a base; allowing each of the first two coatings to dry before applying the next coating, whereby the second flexible coating is imprisoned between two layers of more rigid cellulose ester.

7. A process which comprises coating a fabric with a succession of coatings, an intermediate one of said coatings comprising a cellulose ester, a normally non-volatile liquid capable of imparting plasticity and elasticity, and another liquid having a boiling point not below 100° C., and capable of preventing precipitation of the cellulose ester, such intermediate layer being imprisoned between layers of material substantially impervious to such liquids.

8. A process which comprises first stretching the fabric on a frame, and thereafter coating such fabric with a succession of coatings, an intermediate one of said coatings comprising a cellulose ester of a fatty acid, a normally non-volatile liquid capable of imparting plasticity and elasticity, and another liquid capable of imparting softness and flexibility, such intermediate layer being carried between two closely adherent layers of less flexibility and of greater rigidity, whereby a coated structure is provided having a desired degree of rigidity and flexibility.

9. A fabric forming the covering of a wing of an aeroplane, said fabric being provided with a composite coating comprising a succession of at least three layers of compositions each having a fatty acid ester of cellulose as a base, an intermediate one of which layers has a greater elasticity and flexibility than the outer layers, and which contains a solid inert material.

10. A fabric provided with a composite coating comprising a succession of at least three layers of composition containing a cellulose ester of a fatty acid, an intermediate one of which layers has as an ingredient thereof, a liquid of high boiling point capable of increasing the plasticity and elasticity of cellulose ester composition, another liquid capable of increasing the suppleness and flexibility of cellulose ester composition, and another liquid capable of preventing precipitation of cellulose ester in such composition, the evaporation of which liquids is prevented by the imprisonment of such layer between the outer layers.

11. A process of impermeabilizing fabrics which comprises first applying thereto a solution of a cellulose ester, drying, then applying a solution of a fatty acid ester of cellulose, in a volatile solvent, said solution containing as ingredients, non-volatile liquids having high boiling points including an agent capable of imparting elasticity and plasticity, an agent capable of increasing the suppleness and softness and flexibility, and a substance capable of preventing the precipitation of the cellulose ester during the evaporation of the volatile solvent, such solution being combined with an inert material, and allowing the volatile solvent to evaporate, and finally applying a surface coating of a solution of cellulose ester of a fatty acid, and drying.

12. In the coating of the fabric forming the coverings of an aeroplane, the herein described improvement which comprises applying a succession of coating layers, the outer comprising a cellulose ester base, and another comprising cellulose ester with other agents capable of preventing precipitation and of imparting plasticity, elasticity, a degree of softness and suppleness; one of said coating layers carrying a pigment.

13. The method of treating aeroplane and similar fabrics consisting of applying a composition comprising cellulose ester in a volatile solvent, applying a second composition comprising cellulose ester and a stabilizing ingredient in a volatile solvent, and applying a finish protective coating.

14. The method of treating aeroplane and similar fabrics consisting of applying a composition comprising relatively non-inflammable cellulose ester and applying to such coated structure a separate protective coating containing material opaque to actinic rays.

15. A process which comprises first stretching the fabric on a frame and thereafter coating such fabric with a succession of coatings, an intermediate one of said coatings comprising a cellulose ester of a fatty acid and a normally non-volatile liquid capable of imparting plasticity and elasticity, such intermediate layer being carried between two closely adherent layers of less flexibility and of great rigidity, whereby a whole is provided having a desired degree of rigidity and flexibility.

16. A fabric carried under tension upon a framework of an aeroplane element having a plurality of dried coating layers thereupon, the base of such coating layers being a cellulose ester and an intermediate one of the said layers in their final dried state having a greater degree of softness, suppleness, plasticity and elasticity, than the outer layers.

17. A fabric carried under tension upon a framework of an aeroplane element, having a plurality of dried coating layers thereupon, the base of such coating layers being a cellulose ester, an intermediate one of the said layers in their final dried state having a greater degree of softness, suppleness, plasticity and elasticity than the outer layers, and at least one of such layers carrying a pigment as an ingredient.

The foregoing specification of my coating composition and process of applying same, intended more particularly for coating aeroplane cloths, signed by me this 14th day of September, 1916.

THEODORE FRANÇOIS TESSE.

Witnesses:
TRACY LAY,
FRANÇOIS WEBER.